US012571955B2

(12) United States Patent
Nykerk

(10) Patent No.: US 12,571,955 B2
(45) Date of Patent: Mar. 10, 2026

(54) LIGHT PIPE LIGHTING APPARATUS

(71) Applicant: Flex-N-Gate Advanced Product Development, LLC, Windsor (CA)

(72) Inventor: Todd Nykerk, Holland, MI (US)

(73) Assignee: Flex-N-Gate Advanced Product Development, LLC, Windsor (CA)

( * ) Notice: Subject to any disclaimer, the term of this patent is extended or adjusted under 35 U.S.C. 154(b) by 0 days.

(21) Appl. No.: 19/034,179

(22) Filed: Jan. 22, 2025

(65) Prior Publication Data

US 2025/0244515 A1     Jul. 31, 2025

Related U.S. Application Data

(60) Provisional application No. 63/626,498, filed on Jan. 29, 2024.

(51) Int. Cl.
*F21V 8/00* (2006.01)
*F21S 41/24* (2018.01)
*F21S 43/237* (2018.01)

(52) U.S. Cl.
CPC .............. *G02B 6/001* (2013.01); *F21S 41/24* (2018.01); *F21S 43/237* (2018.01); *G02B 6/0006* (2013.01)

(58) Field of Classification Search
CPC .... F21S 41/24; F21S 43/237; G02B 27/0994; G02B 6/001
See application file for complete search history.

(56) References Cited

U.S. PATENT DOCUMENTS

| | | | |
|---|---|---|---|
| 7,086,765 B2 | 8/2006 | Wehner | |
| 7,341,365 B2 | 3/2008 | Basile et al. | |

| | | | |
|---|---|---|---|
| 9,772,085 B2 | 9/2017 | Dubosc | |
| 10,443,790 B2 | 10/2019 | George et al. | |
| 11,506,359 B2 | 11/2022 | Nykerk | |
| 2003/0147055 A1 | 8/2003 | Yokoyama | |
| 2007/0064409 A1* | 3/2007 | Hulse | F21V 5/041 |
| | | | 362/230 |
| 2015/0330593 A1 | 11/2015 | Larsen et al. | |
| 2019/0293857 A1 | 9/2019 | Martoch et al. | |
| 2020/0026091 A1 | 1/2020 | Nykerk | |
| 2020/0400283 A1* | 12/2020 | Nykerk | F21S 43/14 |
| 2021/0372592 A1 | 12/2021 | Nykerk | |

FOREIGN PATENT DOCUMENTS

| | | |
|---|---|---|
| DE | 102013104176 A1 | 10/2014 |
| FR | 3099227 A1 | 1/2021 |
| JP | 2018160478 A | 10/2018 |

OTHER PUBLICATIONS

Extended European Search Report issued Jun. 3, 2025 in EP Application No. 25154592.7.

* cited by examiner

*Primary Examiner* — Sean P Gramling
(74) *Attorney, Agent, or Firm* — Avek IP, LLC

(57)     ABSTRACT

A light-pipe lighting apparatus includes a light source with a collimating light pipe disposed adjacent the light source. An optical sheet is disposed adjacent the collimating light pipe opposite the light source. A mask is disposed adjacent the optical sheet opposite the collimating light pipe. A projection light pipe is disposed adjacent the mask and opposite the optical sheet. Light emitted from the light source is modified as it passes through the collimating light pipe, the optical sheet, the mask, and the projection light pipe thereby projecting an illuminated image. Based on patterns of transparent portions of the mask, corresponding patterns of illuminated images are projected from the light-pipe lighting apparatus.

13 Claims, 9 Drawing Sheets

LIGHT PIPE LIGHTING APPARATUS

CROSS-REFERENCE TO RELATED APPLICATIONS

This application claims the benefit of priority of U.S. Provisional Patent Application No. 63/626,498, entitled Lit Light Pipes with Graphic Images and filed on Jan. 29, 2024, the disclosure of which is herein incorporated by reference in its entirety.

BACKGROUND OF THE INVENTION

1. Field

The disclosed embodiments relate generally to the field of lighting displays. More specifically, the disclosed embodiments relate to providing images that appear to be three dimensional when viewed dynamically.

2. Description of the Related Art

Many different types of lighting assemblies having a light pipe have been described in the prior art. For example, U.S. Pat. No. 11,506,359 to Nykerk describes lamp assemblies with illuminated light pipes. U.S. Pat. No. 10,443,790 to George et al. discloses a light pipe assembly with a LED light source at one end. The pipe has a surface with an emitting portion and an overlay portion, along with a reflective secondary surface. U.S. Pat. No. 9,772,085 to Dubosc discloses an optical light emission system for vehicles comprised of two lighting subsystems with a light guide for mixing and homogenizing the two light sources. U.S. Pat. No. 7,341,365 to Basile et al. discloses an LED unit for a vehicle lamp assembly having a housing, LEDs, a light pipe, and an optic structure. The optic structure is used to scatter light in a series of directions distal to the housing. U.S. Pat. No. 7,086,765 to Wehner discloses an LED lamp assembly with an array of LEDs that emit light onto a reflector, and the reflector reflects the light into a light beam. A light pipe is positioned in front of the reflector and receives light from a separate LED at its end.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In certain embodiments, a light-pipe lighting apparatus includes: a light source; a collimating light pipe disposed adjacent the light source; an optical sheet disposed adjacent the collimating light pipe opposite the light source; a mask disposed adjacent the optical sheet opposite the collimating light pipe; and a projection light pipe disposed adjacent the mask opposite the optical sheet, wherein light emitted from the light source is modified as it passes through the collimating light pipe, the optical sheet, the mask, and the projection light pipe thereby projecting an illuminated image.

In certain embodiments, the collimating light pipe includes one or more elongated optical members configured to collimate light emitted from the light source.

In certain embodiments, the light source includes an array of light-emitting diodes aligned substantially along a length of each of the one or more elongated optical members.

In certain embodiments, the optical sheet includes an optically clear plastic sheet having an array of light modifying elements on one side configured to shape light emitted from the collimating light pipe.

In certain embodiments, the mask includes a plurality of opaque or semi-opaque portions for blocking light and a plurality of transparent portions for enabling light to shine through and form the illuminated image.

In certain embodiments, the plurality of transparent portions include holes formed through the mask.

In certain embodiments, the plurality of transparent portions include a pattern configured to provide a corresponding pattern of illuminated images.

In certain embodiments, the projection light pipe includes one or more elongated optical members each having a cross-sectional shape of a circle or oval such that as light travels through the projection light pipe, the light is inverted and reduced in size.

In certain embodiments, a second light source is disposed at an end of the collimating light pipe, wherein light from the second light source is configured to illuminate the collimating light pipe along its axis.

In certain embodiments, a second light source is disposed at an end of the projection light pipe, wherein light from the second light source is configured to illuminate the projection light pipe along its axis.

In certain embodiments, the collimating light pipe includes a curve along its longitudinal axis and the light source includes an array of light-emitting diodes arranged with a matching curve aligned with the collimating light pipe.

In certain embodiments, the projection light pipe includes a curve along its longitudinal axis to match the curve of the collimating light pipe and the light source.

In certain embodiments, a method of forming an illuminated image with a light-pipe lighting apparatus includes: transmitting light via a light source; collimating light emitted from the light source via a collimating light pipe disposed adjacent the light source; diffusing light emitted from the collimating light pipe via an optical sheet disposed adjacent the collimating light pipe opposite the light source; blocking portions of light passing through the optical sheet via a mask disposed adjacent the optical sheet opposite the collimating light pipe; and projecting an illuminated image from a projection light pipe disposed adjacent the mask opposite the optical sheet.

In certain embodiments, the method includes projecting the illuminated image includes projecting a pattern of images corresponding to a pattern of transparent portions of the mask.

In certain embodiments, the method includes: a) projecting brightly lit images corresponding to the pattern of transparent portions of the mask, b) projecting dimly lit images corresponding to diffusion of light through the projection light pipe, and c) unlit portions of the projection light pipe.

BRIEF DESCRIPTION OF SEVERAL VIEWS OF THE DRAWINGS

Illustrative embodiments are described in detail below with reference to the attached drawing figures, which are incorporated by reference herein and wherein.

Figure 1:
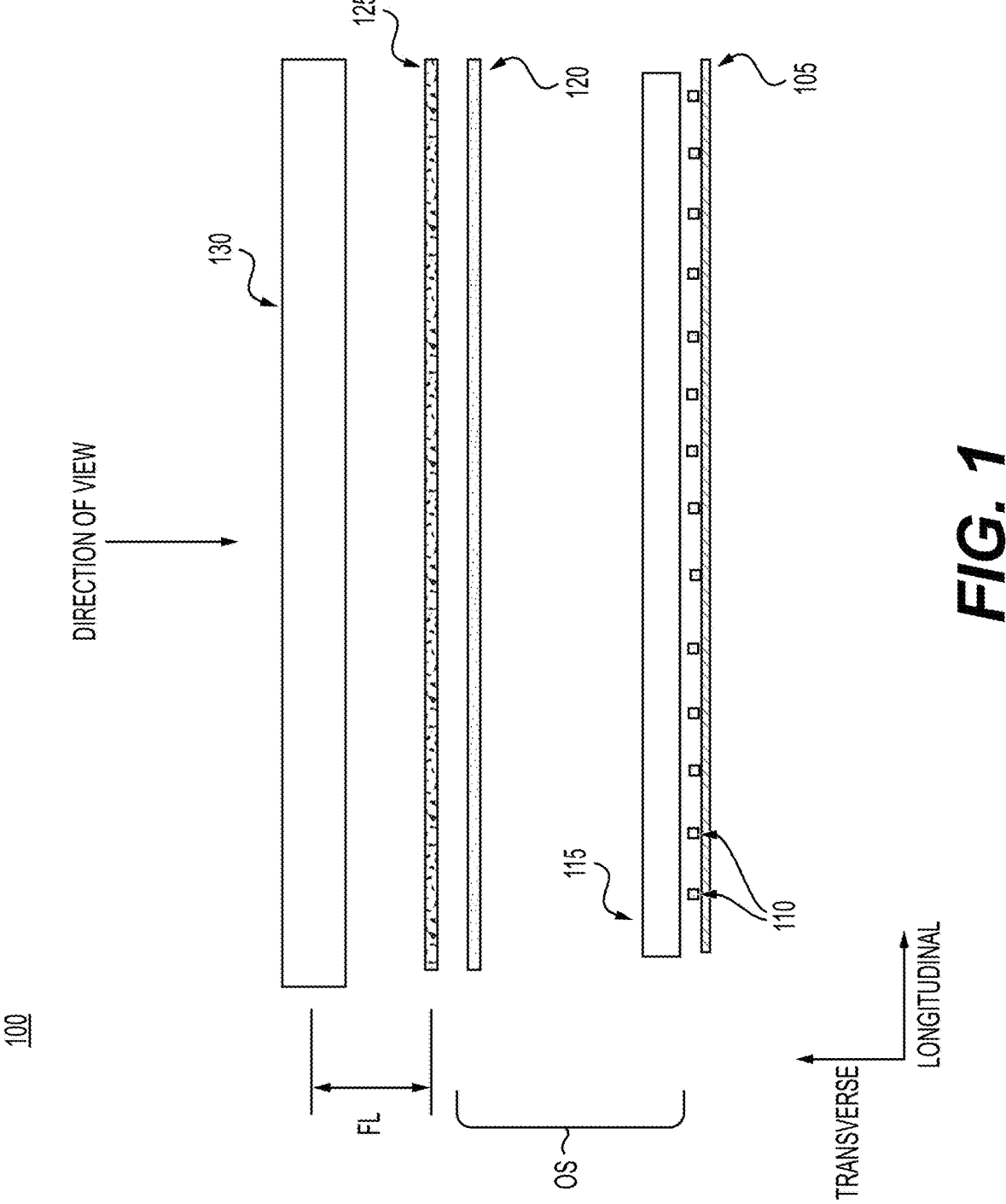
FIG. 1 shows an exploded view of a light-pipe lighting apparatus, according to some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

It must be noted that as used herein and, in the claims, the singular forms "a," "an" and "the" include plural referents unless the context clearly dictates otherwise. Thus, for example, reference to "a layer" includes two or more layers, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Where the modifier "about" or "approximately" is used, the stated quantity can vary by up to 10%.

The term "horizontal" as used herein will be understood to be defined as a plane parallel to the plane or surface of the substrate, regardless of the orientation of the substrate. The term "vertical" will refer to a direction perpendicular to the horizontal as previously defined. Terms such as "above", "below", "bottom", "top", "side" (e.g. sidewall), "higher", "lower", "upper", "over", and "under", are defined with respect to the horizontal plane. The term "on" means there is direct contact between the elements. The term "above" will allow for intervening elements.

As used herein, the terms "first," "second," and other ordinals will be understood to provide differentiation only, rather than imposing any specific spatial or temporal order.

As used herein, the term "substantially" generally refers to ±5% of a stated value.

Embodiments disclosed herein include a light-pipe lighting apparatus which comprises several integral elements: a light source, an optical source, a mask, and a light pipe. The light source typically consists of an LED array tailored to match the length and shape of the light pipe. Positioned between the LED array and the mask, the optical source alters light to create specific characteristics, such as homogeneous, collimated, or amorphous, onto the mask. The mask, a flat, opaque or semi-opaque sheet features transparent areas or patterns through which the altered light shines when illuminated.

This light pattern then transfers into the light pipe, creating a reduced and inverted image contingent upon the distance between the mask and the light pipe and the size and geometry of the light pipe. This arrangement allows the light pipe to maintain its conventional light propagation functionality while simultaneously producing various patterned projections, examples of which are illustrated in the drawings.

FIG. 1 shows a side view of an exemplary light-pipe lighting apparatus 100. Light-pipe lighting apparatus 100 comprises a light source. The light source is typically a printed circuit board (PCB) 105 upon which are mounted a number of light-emitting elements 110. The light-emitting elements 110 are typically light-emitting diodes (LED). Light-emitting elements other than LEDs may be used and still fall within the scope of the claimed subject matter. Examples of the light-emitting elements are discussed in U.S. Pat. No. 11,506,359, issued to the present Assignee and is herein incorporated by reference for all purposes. The light-emitting elements 110 may be arranged in a linear array, a two-dimensional matrix, or other configurations. The light-emitting elements are disposed adjacent an optical source (OS) comprised of a collimating light pipe 115 and an optical sheet 120. The optical source directs the light from the light-emitting elements 110 onto a mask 125. The optical source OS alters the light to have specific characteristics such as homogenous, collimated, amorphous, etc.

The collimating light pipe 115 is for example an elongated optical member, such as cylindrical rods made of an optically clear plastic, e.g., polycarbonate (PC) or poly(methyl methacrylate) (PMMA). A cross sectional shape of collimating light pipe 115 may be cylindrical, oval, square, rectangular, triangular, or any other useful shape. Those skilled in the art will understand that other cross-sectional shapes may be used and still fall within the scope of the claimed subject matter.

The optical sheet 120 is for example an optically clear plastic sheet having an array of light modifying elements (e.g., lenticular lenses) on one side, with the opposite side being flat. The flat side is typically facing the light source while the light modifying elements face away from the light source. In embodiments, the array of light-modifying elements comprise an array of convex lenses that form a lenticular pattern to focus light according to a particular prescription. The lenticular pattern may be aligned in a particular direction throughout a respective sheet. The array of light modifying elements may be imprinted or molded on the sheet in a pattern. Depending on the size, shape, and focal length (FL) of the individual light modifying elements, as well as their collective pattern on the sheet, the optical sheet 120 may be used to shape light from the light source in various ways. For example, light may be shifted, magnified, smoothed, collimated, homogenized, etc. Examples of the optical sheets are discussed in U.S. Pat. No. 11,002,987, issued to the present Assignee and is herein incorporated by reference for all purposes.

Altered light from the optical source OS impinges upon a mask 125 disposed adjacent to the optical sheet 120. Mask 125 blocks portions of light emitted from optical source OS, while allowing other portions of emitted light to pass through, thereby forming a pattern of emitted light. Mask 125 may be opaque or semi-opaque. In some embodiments, mask 125 has a dark color for blocking light and a plurality of holes or transparent portions for enabling light to shine through and form a corresponding image. Examples of images comprise circles, ovals, squares, rectangles, triangles, text, numbers, symbols, logos, icons, etc. Those skilled in the art will understand that other image patterns may be used and still fall within the scope of the claimed subject matter. In some embodiments, mask 125 has the same length and contour as a projection light pipe 130 discussed below. Examples of the mask are discussed in U.S. Pat. No. 10,753,579, issued to the present Assignee and is herein incorporated by reference for all purposes.

Light that is not blocked by the mask 125 impinges upon projection light pipe 130 disposed adjacent to the mask 125. Projection light pipe 130 is for example an elongated optical member, such as cylindrical rods made of an optically clear plastic, e.g., polycarbonate (PC) or poly (methyl methacrylate) (PMMA). A cross-sectional shape of projection light pipe 130 may be a circle or an oval. As the light travels through projection light pipe 130, an image is formed on an emission side of projection light pipe 130 opposite the light source such that an image projected from projection light pipe 130 is viewable by an observer from the "direction of view" shown in the figures. In embodiments, the image is inverted and reduced via projection light pipe 130. The size reduction depends upon the size of the projection light pipe 130 and the distance between projection light pipe 130 and the mask 125. The emitted image is viewed from the top of the page as indicated in FIG. 1, with the elongated light pipes 115, 130 generally aligned along the longitudinal axis and the transmitted light projected generally along the transverse axis.

Figures 2A, 2B, 2C:
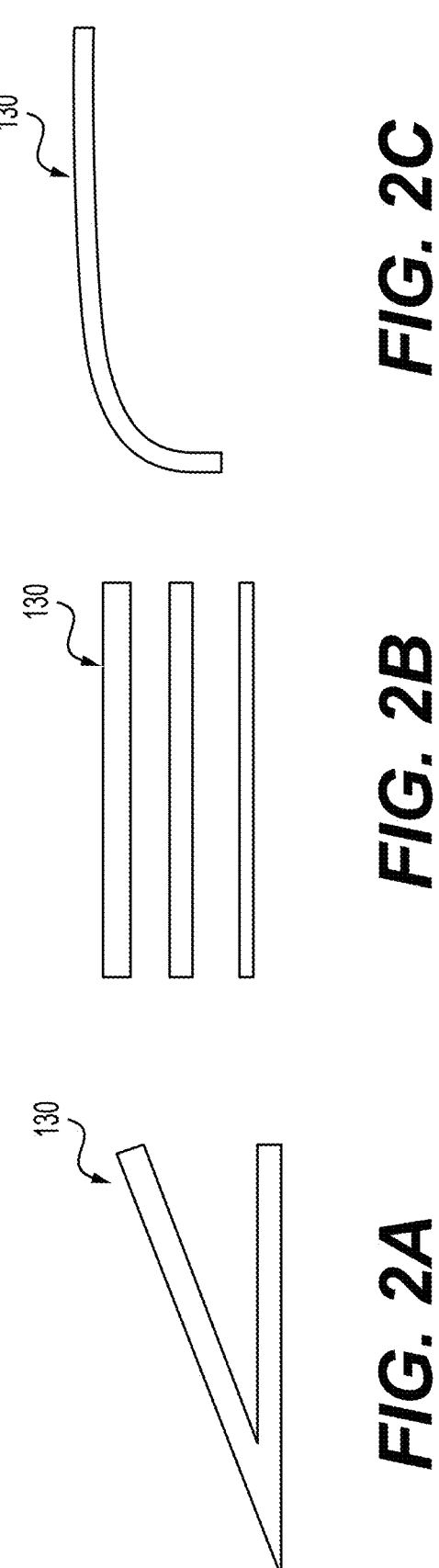
FIGS. 2A-2C show examples of light pipe geometries, according to some embodiments.

FIGS. 2A-2C show examples of light pipe geometries, according to some embodiments. In FIG. 2A the projection light pipe 130 is constructed to form an angled configuration. The angle is illustrated as being an acute angle. However, those having skill in the art will understand that any angle between 0 degrees and 360 degrees may be used and still fall within the scope of the claimed subject matter. In FIG. 2B the projection light pipe 130 is constructed as a linear member and illustrates the concept of varying pipe sizes (i.e. varying cross sectional areas). As discussed previously, the size of the projection light pipe 130 will impact the size reduction of the projected image. In FIG. 2C the projection light pipe 130 is illustrated as having curved sections where the projection light pipe 130 has curvature along its longitudinal axis. FIG. 2C illustrates a single curve. However, those having skill in the art will understand that any number of curves with a variety of curvatures may be used and still fall within the scope of the claimed subject matter. Generally, the geometry of projection light pipe 130 may be altered to conform to the specific application of the light-pipe lighting apparatus. IN embodiments having curved section(s) along the longitudinal axis of projection light pipe 130, the array of light-emitting elements 110 has matching curved sections(s) aligned with the collimating light pipe 115 and the projection light pipe 130.

Figure 3:
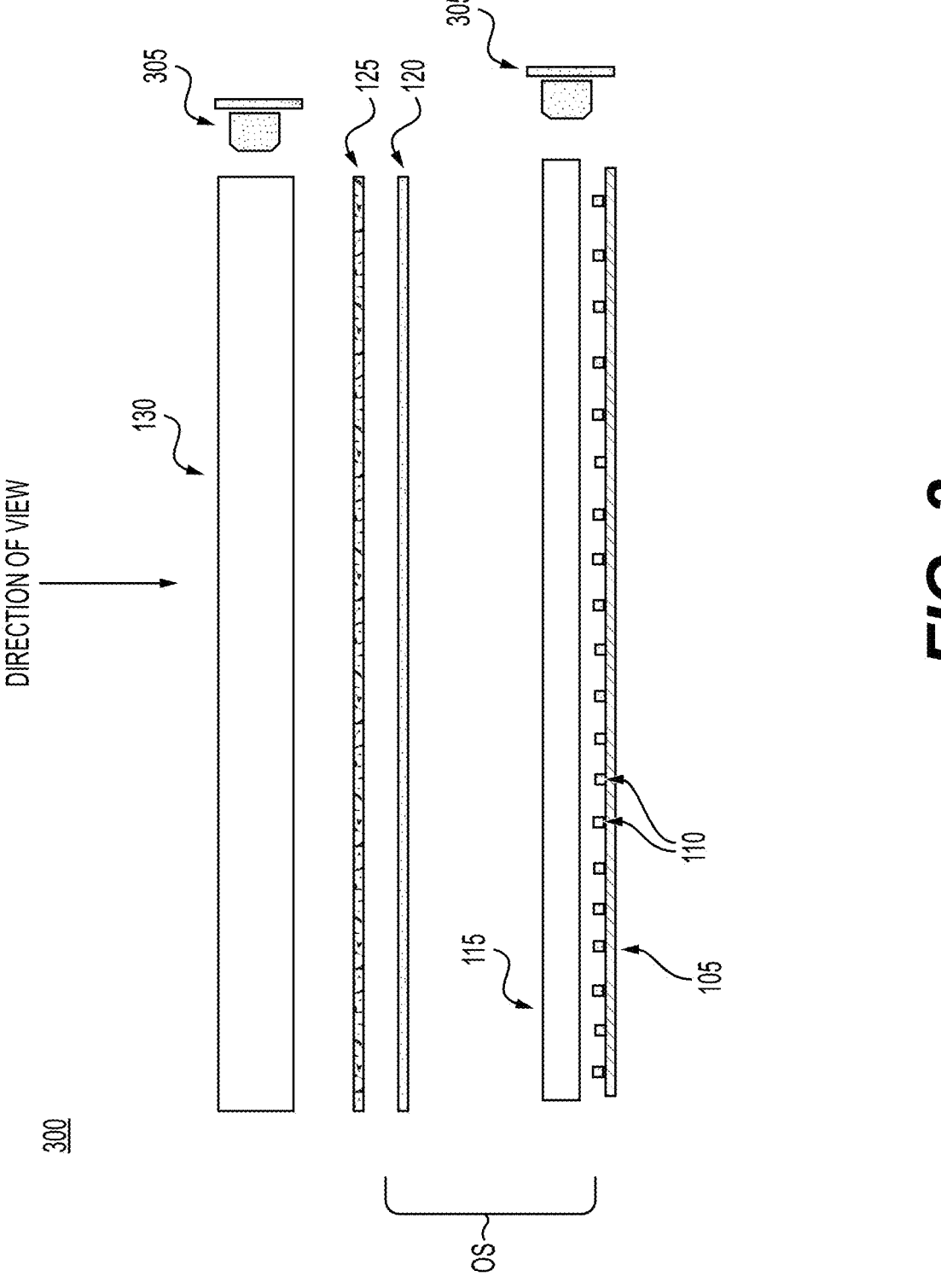
FIG. 3 shows an exploded view of a light-pipe lighting apparatus, according to some embodiments.

FIG. 3 shows an exploded view of a light-pipe lighting apparatus 300, according to some embodiments. FIG. 3 is a variation of the apparatus illustrated in FIG. 1. FIG. 3 illustrates a variation wherein a second light source(s) 305 is disposed at one end of the light pipe and illuminates the light pipe along its longitudinal axis as is well known. Light source(s) 305 is typically one or more LEDs. Light sources other than LEDs may be used and still fall within the scope of the claimed subject matter. The remaining components in FIG. 3 are the same and operate in the same manner as described in FIG. 1. Second light source(s) 305 are operable to modulate the overall brightness of the light-pipe lighting apparatus. In some embodiments, only collimating light pipe 115 is lit by a second light source(s) 305. In some embodiments, only projection light pipe 130 is lit by a second light source(s) 305. In some embodiments, both collimating light pipe 115 and projection light pipe 130 are lit by a second light source(s) 305.

Figure 4:
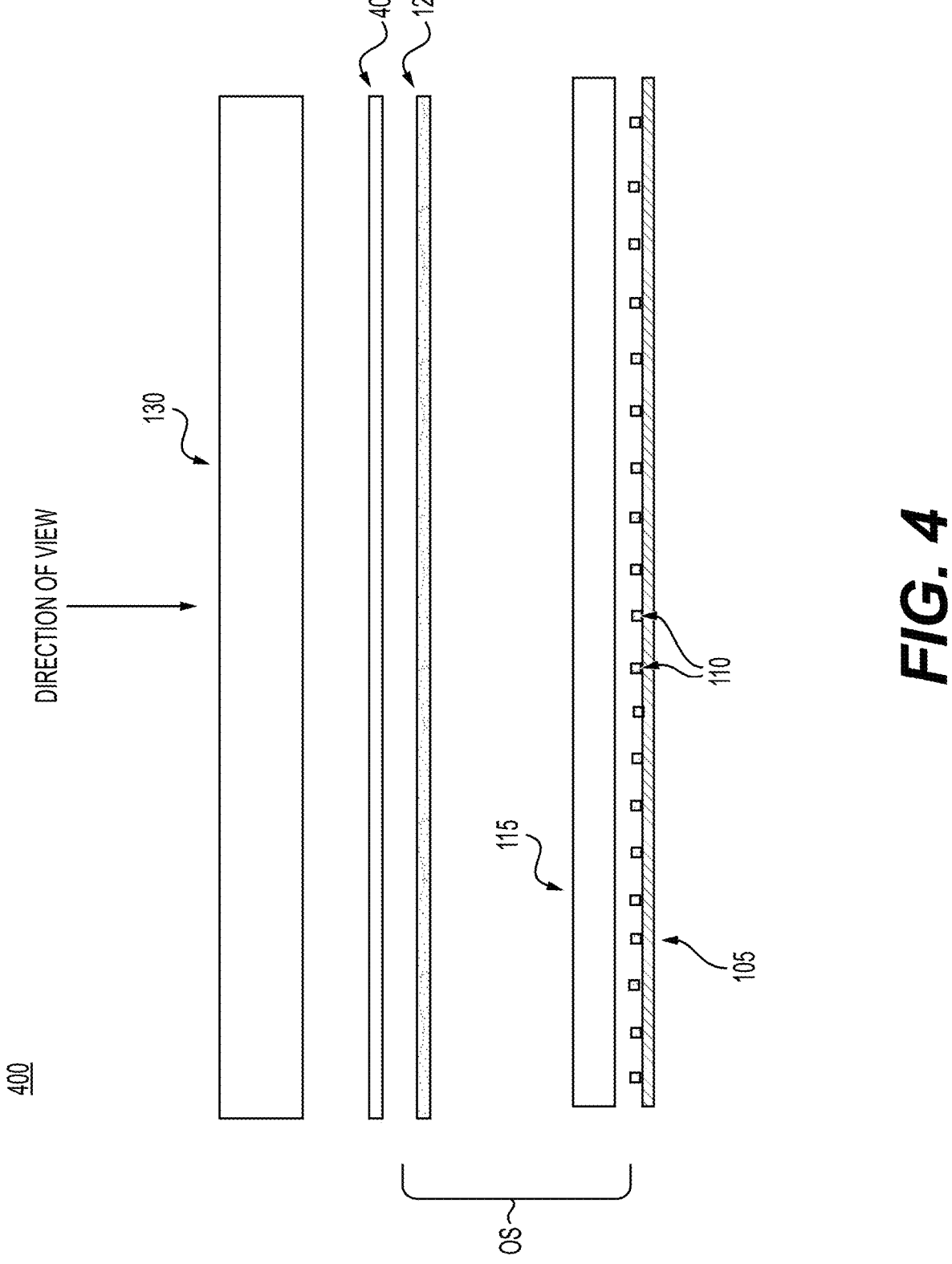
FIG. 4 shows an exploded view of a light-pipe lighting apparatus, according to some embodiments.

FIG. 4 shows an exploded view of a light-pipe lighting apparatus 400, according to some embodiments. FIG. 4 is a variation of the apparatus illustrated in FIG. 1. FIG. 4 illustrates a variation wherein mask 405 is a semi-opaque member with clear hole patterns used to form the image. In this variation, the clear hole patterns allow an image to be produced that appears to be brightly lit to the observer. The semi-opaque nature of the mask background allows light to pass through but at a much lower intensity than the brightly lit image. The remaining components in FIG. 4 are the same and operate in the same manner as described in FIG. 1. A variation (not shown) of FIG. 4 also includes the second light source(s) 305 as described with respect to FIG. 3.

Figure 5:
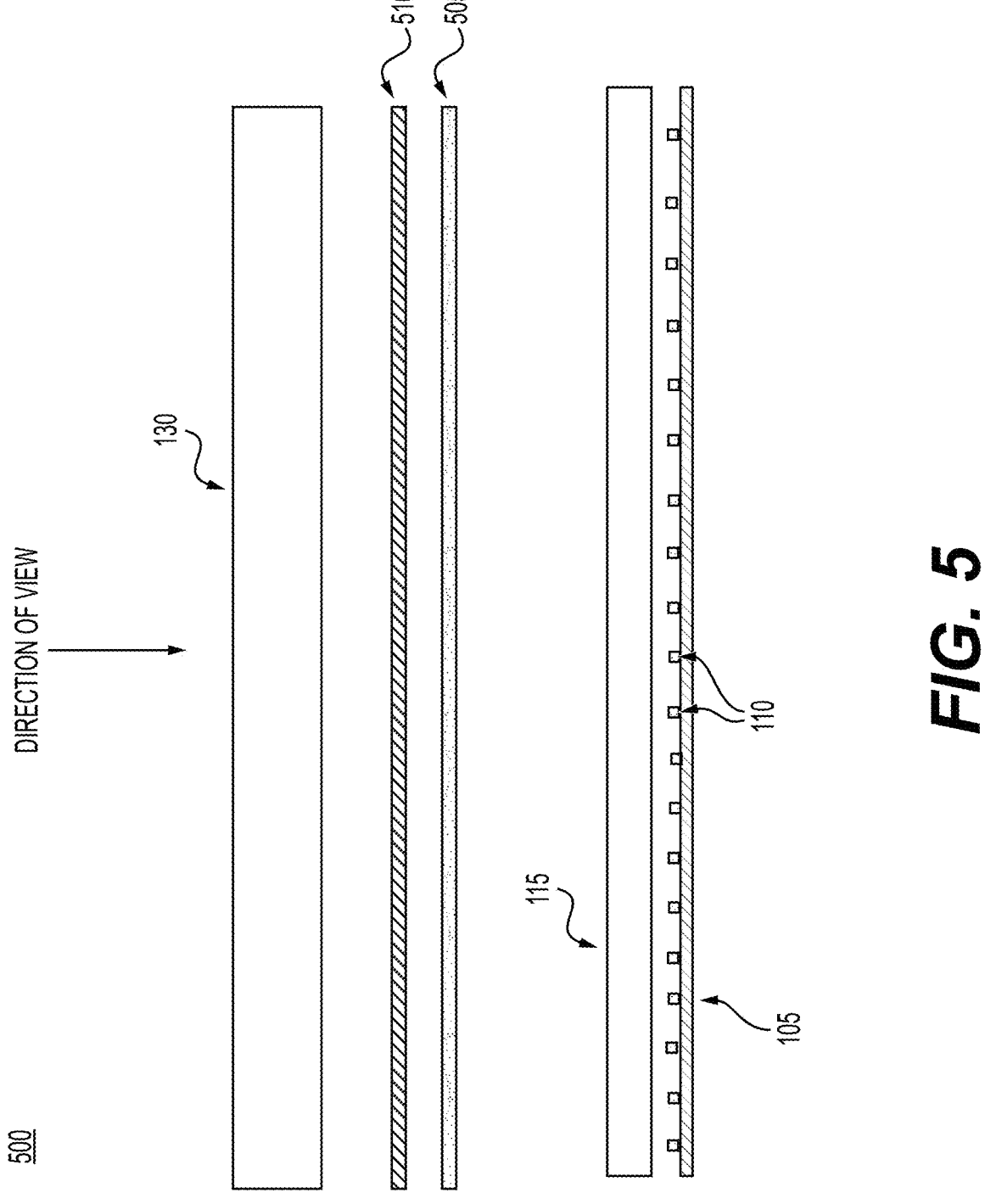
FIG. 5 shows an exploded view of a light-pipe lighting apparatus, according to some embodiments.

FIG. 5 shows an exploded view of a light-pipe lighting apparatus 500, according to some embodiments. FIG. 5 is a variation of the apparatus illustrated in FIG. 1. In FIG. 5, the mask 125 is replaced by a pair of optical sheets, first optical sheet 505 and second optical sheet 510. First and second optical sheets 505, 510 are aligned substantially parallel with one another. First and second optical sheets 505, 510 are examples of the layer of optical sheets 120, in FIG. 1 that are adapted to focus light from optical source OS. In certain embodiments, the first and second optical sheets 505, 510 are lenticular sheets arranged with their lenticular patterns aligned and offset from one another by a slight angle. The alignment of first and second optical sheets 505, 510 negate a natural spread of the optics and enable the formation of two separate but closely aligned optical images. The result may be an apparent 3-dimensional (3D) image as viewed by the observer. The remaining components in FIG. 5 are the same and operate in the same manner as described in FIG. 1. A variation (not shown) of FIG. 5 also includes the second light source(s) 305 as described with respect to FIG. 3.

Figure 6:
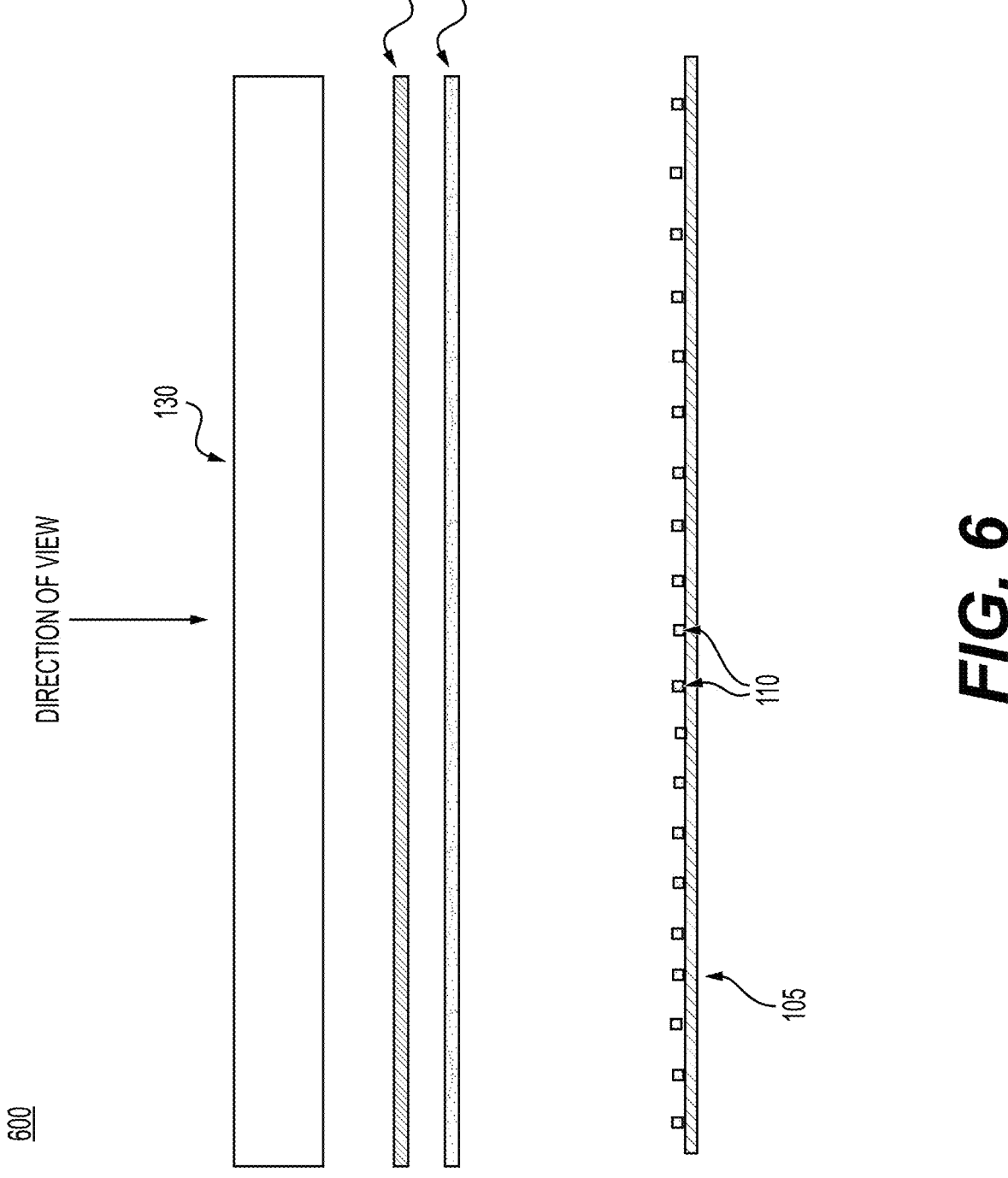
FIG. 6 shows an exploded view of a light-pipe lighting apparatus, according to some embodiments.

FIG. 6 shows an exploded view of a light-pipe lighting apparatus 600, according to some embodiments. FIG. 6 is a variation of the apparatus illustrated in FIG. 1. In FIG. 6, collimating light pipe 115 is removed from the apparatus. Therefore, the light may not be shifted, magnified, smoothed, collimated, homogenized, etc. before it interacts with optical sheet 120. The removal of the collimating light pipe 115 allows the individual light-emitting elements 110 to directly interact with optical sheet 120, mask 125, and projection light pipe 130. This interaction results in a pattern of small intense lights to be emitted from the mask. This gives the image a sparkling effect. The remaining components in FIG. 6 are the same and operate in the same manner as described in FIG. 1. A variation (not shown) of FIG. 6 also includes the second light source(s) 305 as described with respect to FIG. 3.

Figure 7:
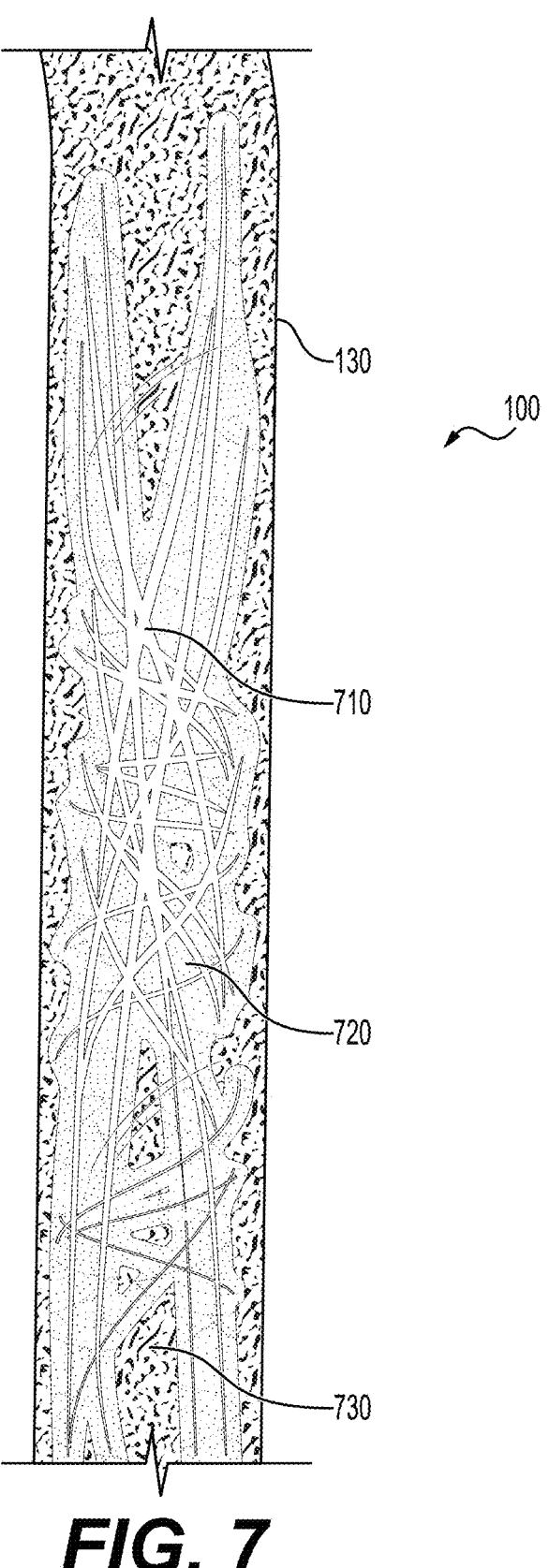
FIG. 7 shows an exemplary result of a light-pipe lighting apparatus, according to some embodiments.
Figure 8:
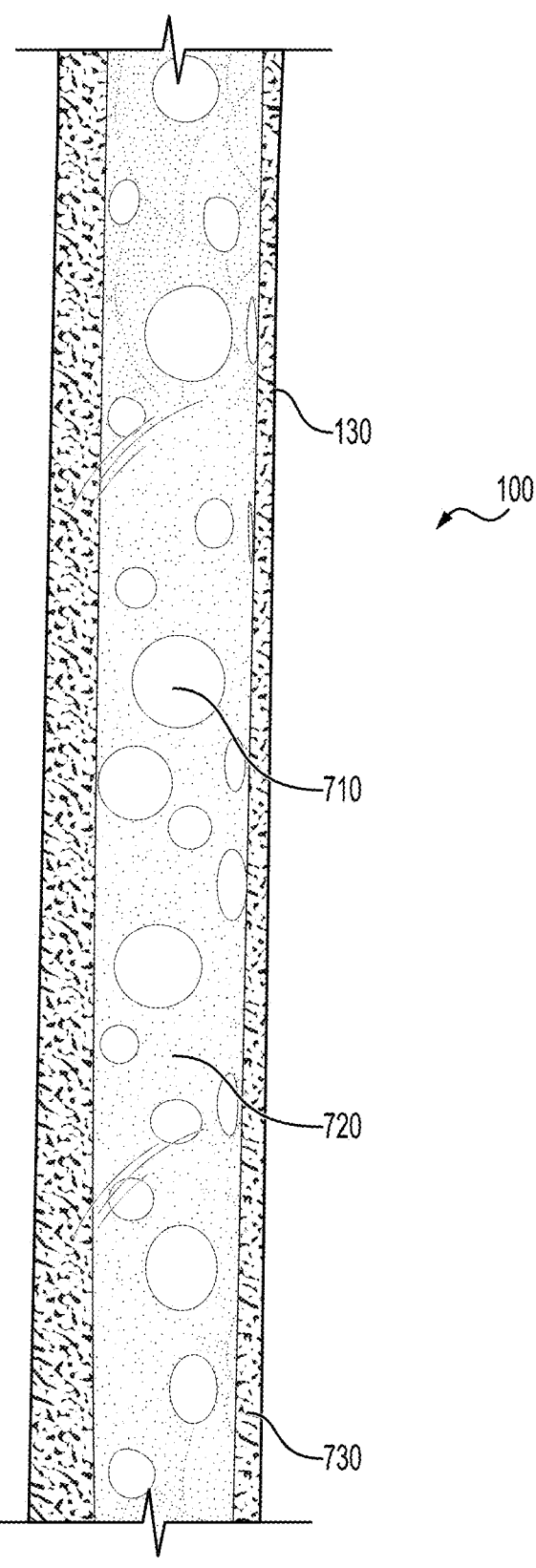
FIG. 8 shows an exemplary result of a light-pipe lighting apparatus, according to some embodiments.
Figure 9:
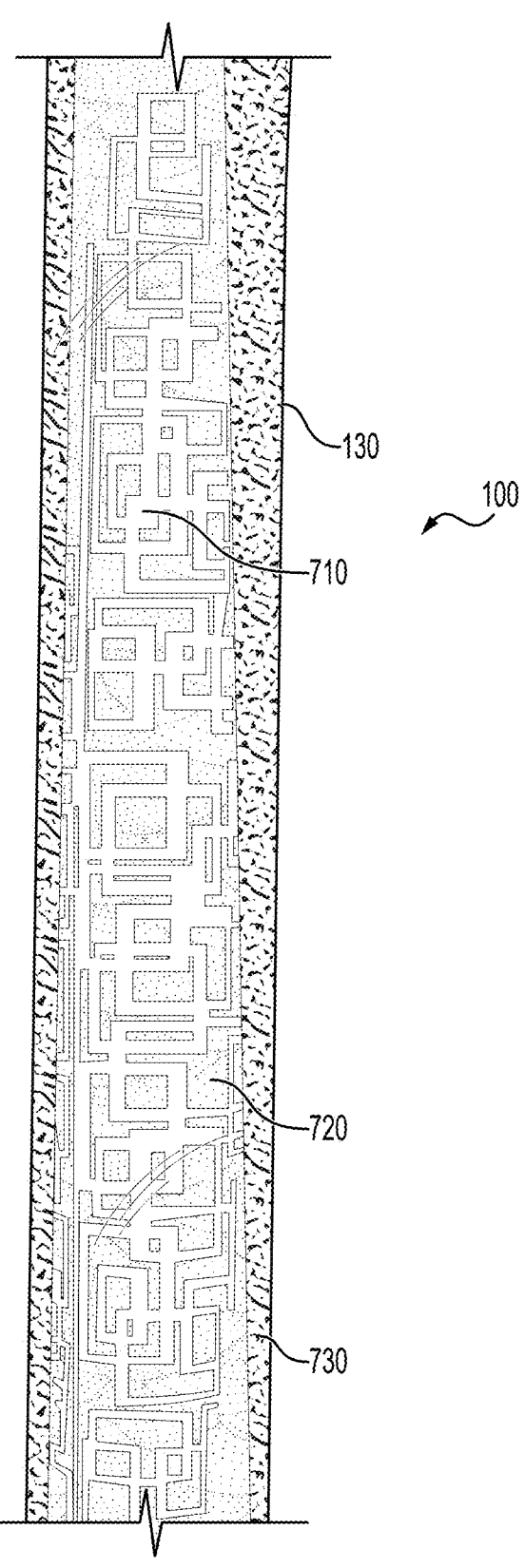
FIG. 9 shows an exemplary result of a light-pipe lighting apparatus, according to some embodiments.

FIGS. 7-9 show exemplary results of light-pipe lighting apparatus 100 operating in an illuminated state as perceived from the direction of view shown in FIGS. 1 and 3-6, according to some embodiments. In FIGS. 7-9, mask 125 comprises transparent patterns that allow light to pass through resulting in brightly lit images 710 projected from the projection light pipe 130. Surrounding the brightly lit images 710, dimly lit images 720 are formed by diffusion and spreading of light as it passes through the projection light pipe 130. Unlit portions 730 are those portions in which light from the light source is effectively blocked by the mask 125 such that substantially little or no light is projected through the projection light pipe 130. Not all of the bright, dim, and unlit portions are enumerated in FIGS. 7-9 for clarity of illustration.

In FIG. 7, mask 125 comprises transparent patterns in the form of arcs and lines. In FIG. 8, mask 125 comprises transparent patterns in the form of circles. In FIG. 9, mask 125 comprises transparent patterns in the form of lines having square and rectangular shapes.

FIGS. 7-9 are examples of potential images that may be formed using the light-pipe lighting apparatus described herein. Examples of images comprise circles, ovals, squares, rectangles, triangles, text, numbers, symbols, logos, icons, etc. Those skilled in the art will understand that other image patterns may be used and still fall within the scope of the claimed subject matter.

In operation, a method of forming an illuminated image with a light-pipe lighting apparatus includes transmitting light via a light source (e.g., array of light-emitting elements 110). In embodiments, light emitted from the light source is collimated via collimating light pipe 115 disposed adjacent the light source (see e.g., FIG. 1). Light emitted from collimating light pipe 115 is modified (e.g., diffused and/or homogenized) via optical sheet 120 disposed adjacent collimating light pipe 115 opposite the light source, as shown in the figures. Portions of light passing through optical sheet 120 are blocked via mask 125 disposed adjacent optical sheet 120 opposite collimating light pipe 115. An illuminated image is projected from projection light pipe 130 disposed adjacent mask 125 opposite optical sheet 120.

In some embodiments, projecting the illuminated image comprises projecting a pattern of images corresponding to a pattern of transparent portions of mask 125. For example, projecting the pattern of images may include: a) projecting brightly lit images corresponding to the pattern of transparent portions of the mask, b) projecting dimly lit images corresponding to diffusion of light through the projection light pipe, and c) unlit portions of the projection light pipe, as illustrated in FIGS. 7-9.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. A light-pipe lighting apparatus, the lighting apparatus comprising:
   a light source;
   a collimating light pipe disposed adjacent the light source;
   an optical sheet disposed adjacent the collimating light pipe opposite the light source;
   a mask disposed adjacent the optical sheet opposite the collimating light pipe, wherein the mask comprises a plurality of opaque portions for blocking light and a plurality of transparent portions for enabling a pattern of light to shine through; and
   a projection light pipe disposed adjacent the mask opposite the optical sheet, wherein light emitted from the light source is modified as it passes through the collimating light pipe, the optical sheet, the mask, and the projection light pipe thereby projecting a pattern of illuminated images.

2. The lighting apparatus of claim 1, wherein the collimating light pipe comprises one or more elongated optical members configured to collimate light emitted from the light source.

3. The lighting apparatus of claim 2, wherein the light source comprises an array of light-emitting diodes aligned substantially along a length of each of the one or more elongated optical members.

4. The lighting apparatus of claim 1, wherein the optical sheet comprises an optically clear plastic sheet having an array of light modifying elements on one side configured to shape light emitted from the collimating light pipe.

5. The lighting apparatus of claim 1, wherein the mask further comprises a plurality of semi-opaque portions for partially blocking light such that light passes through the semi-opaque portions at a lower intensity than the pattern of illuminated images.

6. The lighting apparatus of claim 1, wherein the plurality of transparent portions comprise holes formed through the mask.

7. The lighting apparatus of claim 1, wherein the projection light pipe comprises one or more elongated optical members each having a cross-sectional shape of a circle or oval such that as light travels through the projection light pipe, the light is inverted and reduced in size.

8. The lighting apparatus of claim 1, comprising a second light source disposed at an end of the collimating light pipe, wherein light from the second light source is configured to illuminate the collimating light pipe along its axis.

9. The lighting apparatus of claim 1, comprising a second light source disposed at an end of the projection light pipe, wherein light from the second light source is configured to illuminate the projection light pipe along its axis.

10. The lighting apparatus of claim 1, wherein the collimating light pipe comprises a curve along its longitudinal axis and the light source comprises an array of light-emitting diodes arranged with a matching curve aligned with the collimating light pipe.

11. The lighting apparatus of claim 10, wherein the projection light pipe comprises a curve along its longitudinal axis to match the curve of the collimating light pipe and the light source.

12. A method of forming an illuminated image pattern with a light-pipe lighting apparatus, the method comprising:

transmitting light via a light source;

collimating light emitted from the light source via a collimating light pipe disposed adjacent the light source;

diffusing light emitted from the collimating light pipe via an optical sheet disposed adjacent the collimating light pipe opposite the light source;

forming a pattern from light passing through the optical sheet via a mask, wherein the mask is disposed adjacent the optical sheet opposite the collimating light pipe, and the mask comprises a plurality of opaque portions for blocking light and a plurality of transparent portions for enabling a pattern of light to shine through; and projecting a pattern of illuminated images from a projection light pipe disposed adjacent the mask opposite the optical sheet.

13. The method of claim 12, wherein the mask further comprises a plurality of semi-opaque portions such that the projection light pipe is configured for: a) projecting a pattern of brightly lit images corresponding to the transparent portions of the mask, b) projecting a pattern of dimly lit images corresponding to the semi-opaque portions of the mask, and c) blocking light to provide unlit portions via the opaque portions of the mask, thereby projecting an illuminated image pattern having varying light intensities.

* * * * *